United States Patent
Derdak et al.

(10) Patent No.: US 10,853,154 B2
(45) Date of Patent: Dec. 1, 2020

(54) ORCHESTRATION OF A SEQUENCE OF COMPUTATIONS BY EXTERNAL SYSTEMS

(71) Applicant: salesforce.com, inc., San Francisco, CA (US)

(72) Inventors: Stefan Derdak, San Francisco, CA (US); Reuben Cornel, San Francisco, CA (US); Hormoz Tarevern, Mountain View, CA (US); Richard Perry Pack, III, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/262,874

(22) Filed: Jan. 30, 2019

(65) Prior Publication Data

US 2020/0241944 A1    Jul. 30, 2020

(51) Int. Cl.
   *G06F 3/00* (2006.01)
   *G06F 9/54* (2006.01)
(52) U.S. Cl.
   CPC .................... *G06F 9/547* (2013.01)
(58) Field of Classification Search
   CPC ........................................ G06F 9/541
   USPC ........................................ 719/328
   See application file for complete search history.

(56) References Cited

U.S. PATENT DOCUMENTS

| | | | |
|---|---|---|---|
| 6,804,818 B1 * | 10/2004 | Codella | G06F 9/541 |
| | | | 717/106 |
| 7,730,478 B2 | 6/2010 | Weissman | |
| 7,779,039 B2 | 8/2010 | Weissman et al. | |
| 9,015,533 B1 * | 4/2015 | Fateev | G06F 11/0715 |
| | | | 714/38.1 |
| 9,195,854 B2 | 11/2015 | Jain et al. | |
| 9,342,384 B1 * | 5/2016 | Lewis | G06T 1/20 |
| 9,448,773 B2 | 9/2016 | Calvin et al. | |
| 9,646,064 B2 | 5/2017 | Shmulevich et al. | |
| 10,007,607 B2 | 6/2018 | Pack, III | |
| 10,037,430 B2 | 7/2018 | Jain et al. | |
| 10,102,133 B2 | 10/2018 | Pack, III | |
| 10,146,597 B2 | 12/2018 | Pack, III et al. | |

(Continued)

OTHER PUBLICATIONS

Long Sun, An Open IoT Framework Based on Microservices Architecture. (Year: 2017).*

*Primary Examiner* — Lechi Truong
(74) *Attorney, Agent, or Firm* — Haynes and Boone, LLP

(57) ABSTRACT

A method is provided for orchestrating a workflow. In some embodiments, the method includes executing a workflow including a first controller that includes a first callout function and a first callback function and corresponds to a first microservice. Execution of the workflow includes execution of the first callout function that causes invocation of the first call to the first microservice. The method further includes receiving a notification of an execution state from the first microservice and transmitting the execution state to the first callback function. The method also includes in response to transmitting the execution state to the first callback function, receiving a function output based on the execution state from the first callback function. The method further includes determining, based on the function output, whether to execute a subsequent controller. The method also includes in response to a determination to execute the subsequent controller, executing the subsequent controller.

20 Claims, 6 Drawing Sheets

(56) References Cited

U.S. PATENT DOCUMENTS

| | | |
|---|---|---|
| 10,409,667 B2 | 9/2019 | Donaldson et al. |
| 10,452,244 B2 | 10/2019 | Davidchuck et al. |
| 2009/0293073 A1* | 11/2009 | Nathan .................. G06F 9/547 |
| | | 719/328 |
| 2010/0125477 A1* | 5/2010 | Mousseau ............. G06F 9/5072 |
| | | 717/177 |
| 2013/0166496 A1* | 6/2013 | Sachs ..................... G06F 9/547 |
| | | 707/602 |
| 2018/0165309 A1 | 6/2018 | Tajuddin et al. |
| 2018/0307605 A1 | 10/2018 | Pack, III |
| 2019/0042438 A1 | 2/2019 | Pack, III |
| 2019/0087311 A1 | 3/2019 | Donaldson et al. |

\* cited by examiner

| Workflow ID | Deployment | Controller Map | Event List |
|---|---|---|---|
| 304 | CUSTOMER DATA | Controller310 -> Pending(KeyID316) | Controller310 -> DataPullStartedEvent |

FIG. 5A

| Workflow ID | Deployment | Controller Map | Event List |
|---|---|---|---|
| 304 | CUSTOMER DATA | Controller310 -> Completed (DatasetID) | Controller320 -> ModelingStartedEvent |
| | | Controller320 -> Pending(KeyID376) | |

FIG. 5B

| Workflow ID | Deployment | Controller Map | Event List |
|---|---|---|---|
| 304 | CUSTOMER DATA | Controller310 -> Completed (DatasetID) | Controller320 -> ModelingFinishedEvent |
| | | Controller320 -> Pending(KeyID376) | |

FIG. 5C

| Workflow ID | Deployment | Controller Map | Event List |
|---|---|---|---|
| 304 | CUSTOMER DATA | Controller310 -> Completed (DatasetID) | |
| | | Controller320 -> Completed(ModelID) | |

FIG. 5D

ORCHESTRATION OF A SEQUENCE OF COMPUTATIONS BY EXTERNAL SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to a computing device, and more specifically to systems and methods for executing a workflow represented by a sequence of functions.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Computer and software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a user-developed application so that a user (e.g., consumer of cloud-based services) no longer needs to operate and support dedicated server hardware. The cloud computing model can often provide substantial cost savings to the user over the life of the application because the user no longer needs to provide dedicated network infrastructure, electrical and temperature controls, physical security and other logistics in support of dedicated server hardware.

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.). In one example, the cloud platform may support customer relationship management (CRM) solutions. This may include support for sales, service, marketing, community, analytics, applications, and the Internet of Things (IoT).

BRIEF DESCRIPTION OF THE DRAWINGS

FIGS. 5A, 5B, 5C and 5D show updated workflow records associated with the workflow according to some embodiments.

Figure 1:
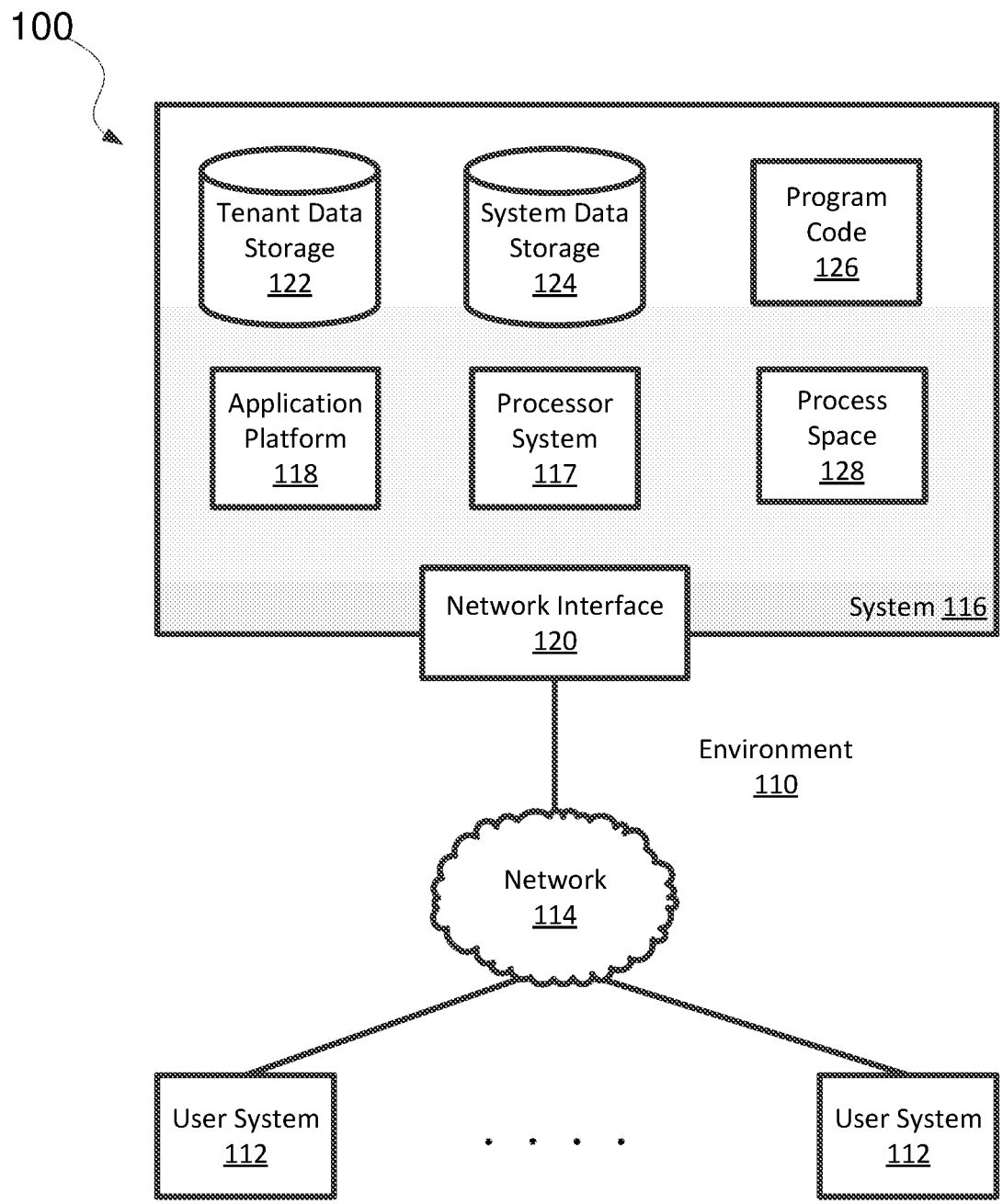
FIG. 1 illustrates a block diagram of an example environment according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

I. Example Environment

The system and methods of the present disclosure can include, incorporate, or operate in conjunction with or in the environment of a database, which in some embodiments can be implemented as a multi-tenant, cloud-based architecture. Multi-tenant cloud-based architectures have been developed to improve collaboration, integration, and community-based cooperation between customer tenants without sacrificing data security. Generally speaking, multi-tenancy refers to a system where a single hardware and software platform simultaneously support multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application features between multiple sets of users.

FIG. 1 illustrates a block diagram of an example environment 110 according to some embodiments. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational database management system (RDBMS) or the equivalent may execute storage and retrieval of information against the database object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third-party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I," that network will be used in many of the examples herein. However, it should be understood that the networks that the present embodiments might use are not so limited, although TCP/IP is a frequently implemented protocol.

The user systems 112 might communicate with system 116 using TCP/IP and, at a higher network level, use other common Internet protocols to communicate, such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a MTS, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 116 may provide tenant access to multiple hosted (standard and custom) applications, including a CRM application. User (or third-party developer) applications, which may or may not include CRM, may be supported by the application platform 118, which manages creation, storage of the applications into one or more database objects, and execution of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each of the user systems 112 could include a desktop personal computer, workstation, laptop, notepad computer, personal digital assistant (PDA), cellphone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the MTS) of the user systems 112 to access, process, and view information, pages, and applications available to it from the system 116 over the network 114. Each of the user systems 112 also typically includes one or more user interface devices, such as a keyboard, mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit (CPU) such as an Intel Pentium® processor or the like. Similarly, system 116 (and additional instances of an MTS, where more than one is present) and all of their components might be operator configurable using application(s) including computer code to run using a CPU such as the processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read-only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object-oriented database management system (OODBMS) or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
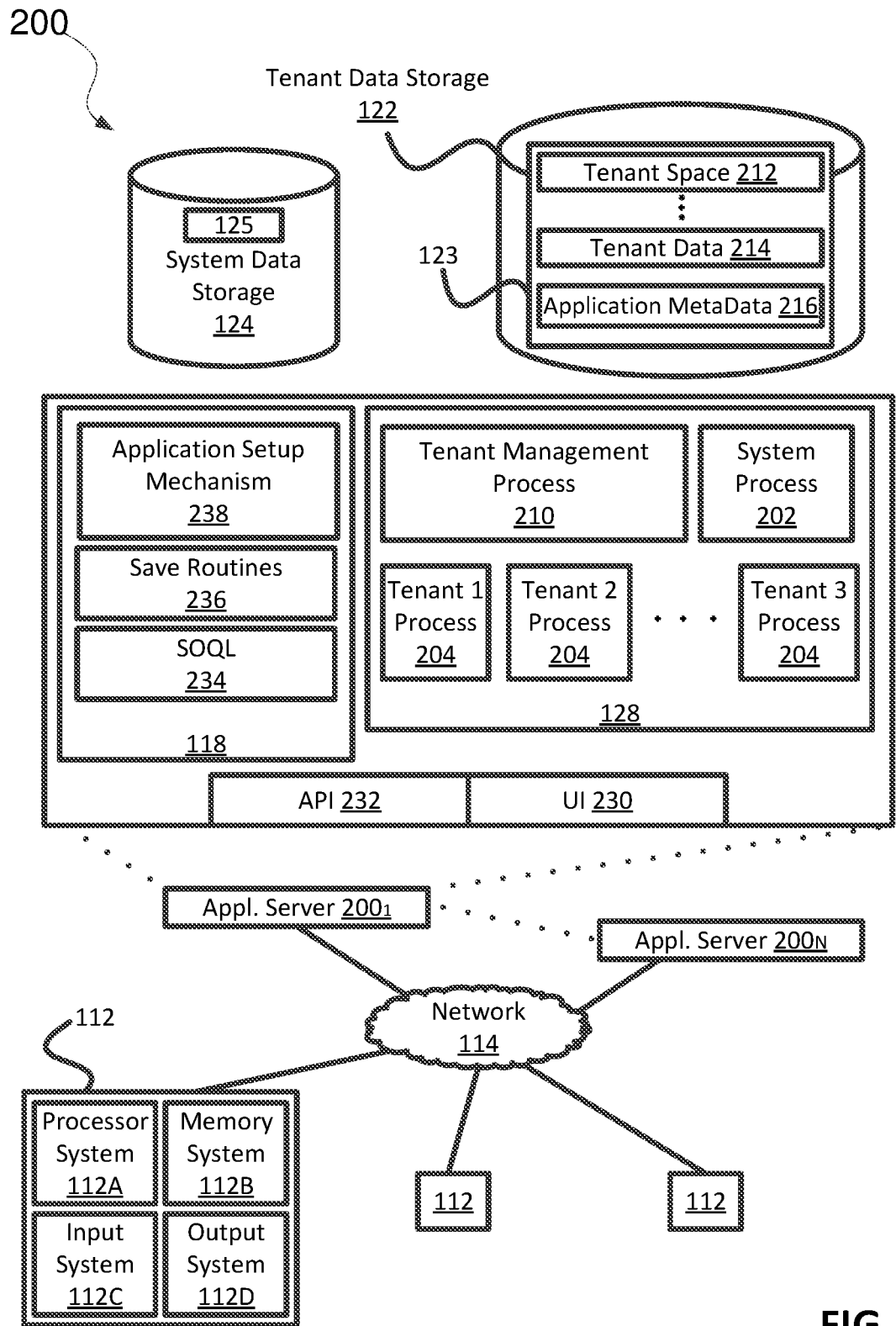
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a Salesforce.com object query language (SOQL) 234, save routines 236, an application setup mechanism 238, applications servers 200₁-200ₙ, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short term, and/or long term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIGS. 1 and 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access the tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a user's most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process 210, for example. Invocations to such applications may be coded using SOQL 234 that provides a programming language style interface extension to the API 232. Some embodiments of SOQL language are discussed in further detail in U.S. Pat. No. 7,730,478, filed Sep., 2007, entitled, "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server 200₁ might be coupled via the network 114 (e.g., the Internet), another application server 200ₙ₋₁ might be coupled via a direct network link, and another application server 200ₙ might be coupled by yet a different network connection. TCP/IP are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement, since all the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant-specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database.

In a database system, such as system 116 shown and described with respect to FIGS. 1 and 2, data or information may be organized or arranged in categories or groupings. Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields.

In a CRM system, for example, these categories or groupings can include various standard entities, such as account, contact, lead, opportunity, group, case, knowledge article, etc., each containing pre-defined fields. For example, a CRM database may include a table that describes a customer with fields for basic contact information such as name, address, phone number, fax number, etc. Another table might describe a purchase order, including fields for information such as customer, product, sale price, date, etc. In some MTS, standard entity tables might be provided for use by all tenants.

In some MTSs, tenants may be allowed to create and store custom objects, or they may be allowed to customize standard entities or objects, for example by creating custom fields for standard objects, including custom index fields. Systems and methods for creating custom objects as well as customizing standard objects in a MTS are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Orchestrator Service for Executing a Workflow

An orchestrator service enforces a series of recurring tasks that make up a workflow. An orchestrator service may integrate two or more applications and/or services together to automate a process, or synchronize data in real-time. A workflow may include a sequence of tasks that process a dataset. Many existing orchestrator services exist and allow a program to define a workflow. In an example, the orchestrator service may allow a user to define a workflow using a graphical user interface (GUI) tool. Using the GUI tool, the user may "draw" bubbles on the screen and connect these bubbles with arrows, where each bubble may represent a task. An execution engine may analyze the drawing and generate a data file based on the tasks represented by the bubbles in the drawing. The drawing model, however, may have its limitations with the drawings. For example, the user is constrained to the bubbles and arrows provided by the GUI tool.

In another example, the orchestrator service may allow a user to define a workflow in terms of a directed acyclic graph. A directed graph is a graph in which the vertices and edges have some sort of order or direction associated with them. A directed acyclic graph is a directed graph without any cycles. A cycle may refer to a series of vertices that connect back to each other in a closed chain. Accordingly, a loop or cycle may not be represented in a directed acyclic graph.

A. Workflow Represented by a Sequence of Controllers

To address these problems, the present disclosure provides techniques for composing workflows from external systems (e.g., microservices). Function composition may represent one or more workflows and may be used to chain an arbitrary sequence of computations. In function composition, an output of one function may be used as an input into another function. The chaining of such functions may be used to represent a workflow. A workflow may be a program and include a sequence of functions representing the processing of an application, where each function that is part of the workflow corresponds to an external system. An example of an external system is a microservice that is used to complete a task. Each microservice may correspond to a controller, which is a function including a callout function and a callback function. A callout function may execute logic to start a task or cause invocation of a call to a microservice. The microservice indicates its state of processing to an orchestrator service 306 using events (e.g., execution state). A callback function handles events containing information about the state of execution of a called microservice. The callback function may return an empty value indicating to the orchestrator service to not proceed with executing the next function, may return a completed value indicating that the current function executed successfully and execution of the workflow may proceed to the next controller, or may throw an exception indicating an error occurred. Additionally, a key is used to associate events coming into a callback function with the original callout function.

Communication with the external systems may be abstracted away by using controllers. An advantage of embodiments of the teachings of the present disclosure may include allowing developers to test their workflows on their local machines without other services being present. For instance, developers may test individual functions to ensure they are working properly. Developers may also type check the workflows. Moreover, workflows provided in the present disclosure may involve interactions between microservices and in some cases interactions between microservices and end users. For example, a workflow may include receiving a user input (e.g., user approval) to trigger computation.

Additionally, developers may leverage the power of a programming language (e.g., Java) when defining workflows. For example, it may be unnecessary for developers to learn a new language to use the system. Further, workflows are not constrained by features of directed acyclic graphs or GUI tools. Rather, complex workflows may be built by using function composition and linking different functions together. The function invocations may be chained together to provide complex behavior. For example, the workflow may include cycles of repeating loops and/or exception handling. The way in which the workflow 304 is represented may be amenable to leveraging a programming language's ability to handle exceptions (e.g., Java® programming language).

Figure 3:
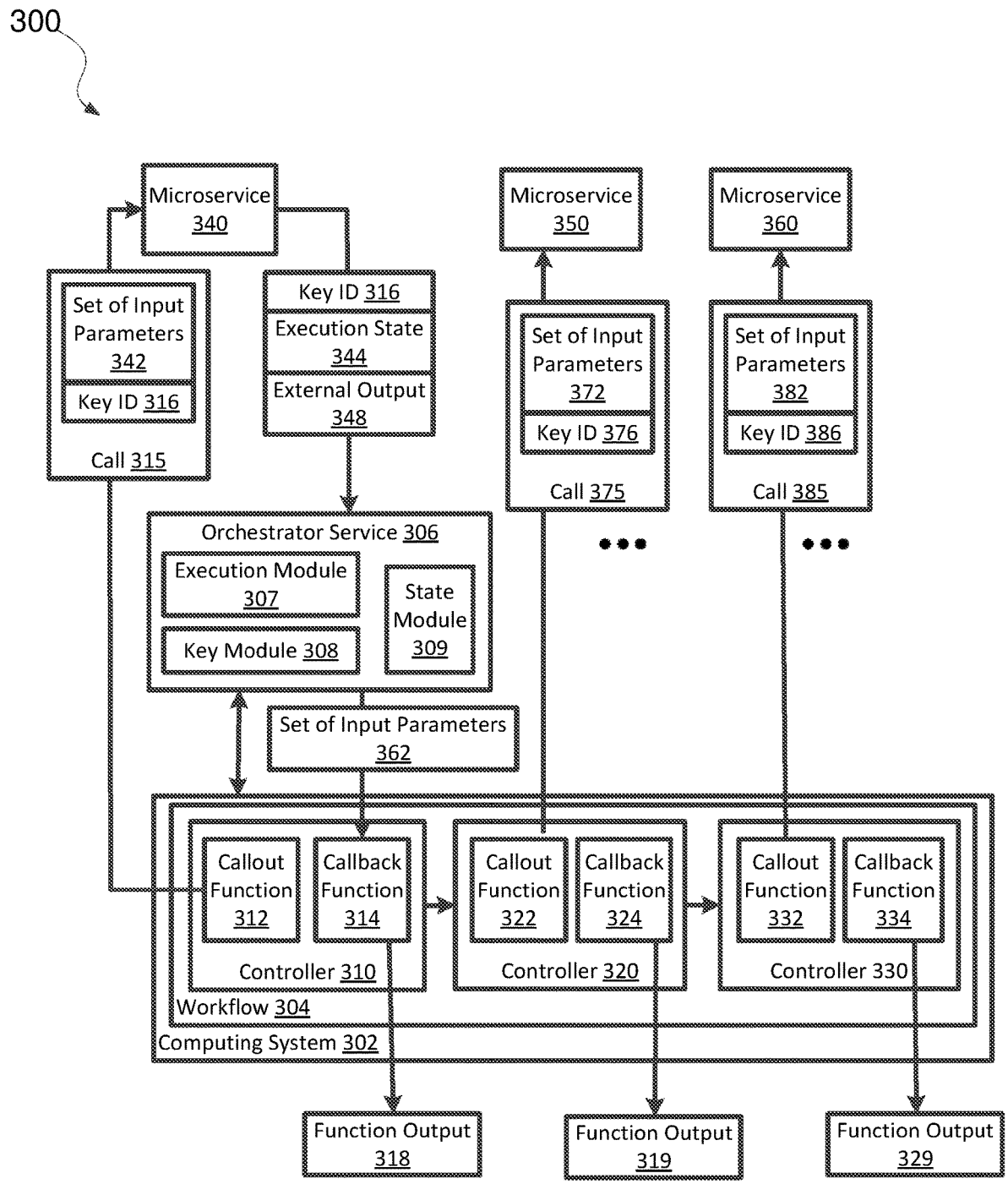
FIG. 3 illustrates a diagram for executing a workflow represented by a function composition according to some embodiments.

FIG. 3 illustrates a diagram 300 for executing a workflow represented by a function composition according to some embodiments. For example, components of diagram 300 may be, in some examples, implemented as part of the example environment 110. In FIG. 3, an orchestrator service 306 may execute a workflow 304 on a computing system 302. The workflow 304 includes controllers 310, 320, and 330. Multiple controllers may execute at the same time for the same workflow 304. The functions included within the controllers 310, 320, and 330 are chained together, and the composition of such chaining resembles a regular function. Controller 310 includes a callout function 312 and a callback function 314, controller 320 includes a callout function 322 and a callback function 324, and controller 330 includes a callout function 332 and a callback function 334. Each controller may represent a function that interacts with a corresponding external system (e.g., microservice). A function accepts a set of input parameters and produces an output. The callout and callback functions included in a controller may be abstracted away to represent a single function that is shown as a controller, as will be explained in further detail below.

The workflow 304 may tie up the functionality of different microservices to complete a sequence of activities. A developer may define a sequence of functions in the workflow 304, which may be a program executing on the computing system 302. In the example illustrated in FIG. 3, the controller 310 corresponds to a microservice 340, the controller 320 corresponds to a microservice 350, and the controller 330 corresponds to a microservice 360. The sequence of microservices 340, 350, and 360 may be stitched together by executing a sequence of functions included in the controllers 310, 320, and 330, respectively. The sequence of controllers 310, 320, and 330 included in the workflow 304 may be used to tie the microservices 340, 350, and 360 together to build an application and direct the interactions between the microservices. A microservice may act like a synchronous function by use of the callout function and the callback function included in the controller corresponding to the microservice. The developer may use controllers to represent interactions with external systems such as the microservices 340, 350, and 360. In an example, microservices 340, 350, and 360 may be asynchronous microservices.

From the point of view of the developer, the workflow 304 may look like it is a synchronous program, but each of the each of the microservices 340, 350, and 360 may be independent systems that process data and perform a task in various timeframes. For example, the microservice 340 may be a long-running task that completes in several hours or days, and the microservice 350 may be a short-running task that completes in a couple minutes. Accordingly, a variable period of time may elapse before a micro service provides a response.

As will be explained in further detail below, the wait time may be abstracted away from the developer of the system. The developer may write a program that ties and integrates different microservices together, without concern for how long each microservice takes to complete the task. In an example, a controller may abstract away the fact that the computing system 302 is communicating with an external system (e.g., microservice) that may be running a process for a long time. Accordingly, it may be unnecessary for the developer writing the program to be aware of when a microservice will be finished processing a task. The programming model may be written in a high-level programming language. In an example, the high-level programming language is JAVA®.

Although in the example illustrated in FIG. 3, the orchestrator service 306 is shown as being separate from the computing system 302, it should be understood that the orchestrator service 306 may reside in the computing system 302. Additionally, each microservice may execute a task on one or more machines, and each of the microservices corresponding to the workflow 304 may run on separate machines from each other.

B. Execution of the Workflow

The orchestrator service 306 may orchestrate the communication flow between the workflow 304 and the microservices. For example, the orchestrator service 306 may assist in representing interactions between microservices and represent them as a program using the workflow 304. The orchestrator service 306 includes an execution module 307, a key module 308, and a state module 309. The execution module 307 executes the workflow 304, which may include "regular" functions (not shown) that are not controllers and may include controllers. While executing the workflow 304, if the execution module 307 encounters a function that is not a controller, the execution module 307 executes the function like it would any other function.

If the execution module 307 encounters a controller that has not yet been executed in the workflow 304, the execution module 307 obtains the controller's name, callout function, callback function, and the key ID associated the controller. In an example, the execution module 307 executes the first callout function 312 in the chain of functions included in the workflow 304, causing a cascade of function executions corresponding to the microservices 340, 350, and 360.

1. Invocation of a Call to a Microservice

Execution of the callout function 312 causes invocation of a call 315 to the corresponding microservice 340. The call 315 may include a set of input parameters 342 and a key identifier (ID) 316. The microservice 340 receives the set of input parameters 342. In the example illustrated in FIG. 3, the callout function 312 passes the set of input parameters 342 to the microservice 340. In another example, the orchestrator service 306 passes the set of input parameters 342 to the microservice 340. Additionally, the key module 308 generates the key ID 316 that is used to associate an event (e.g., an execution state) coming into the callback function 314 with the original callout function 312. The key module 308 assigns the key ID 316 to the callout function 312 that calls the microservice 340. In an example, the orchestrator service 306 may receive an event associated with a second key ID and associate the event with the callout function 312 if the second key ID matches the key ID 316 assigned to the first callout function.

The microservice 340 may process a task using the set of input parameters 342. In some examples, the microservice 340 pulls data from a database (not shown), and the set of input parameters 342 includes the name of the database table from which to retrieve the data and the tenant ID associated with the data. The microservice 340 may pull data from the tenant data storage 122 (see FIG. 1), which may be a MTS. The set of input parameters 342 may include additional information that provides the microservice 340 with information regarding how to pull data from the MTS.

The microservice 340 transmits the key ID 316 and a notification of an execution state 344 to the orchestrator service 306. The execution state 344 may be an event. An event is any input that notifies the orchestrator service 306 of the state of a computation or the state of a user interaction (e.g., user approval). The execution state 344 may provide information on the state of execution on an external system (e.g., microservice 340). In an example, the execution state 344 may be based on invocation of the call 315 associated with the key ID 316 and/or processing the task by the microservice 340 using the set of input parameters 342. In an example, the execution state 344 may be an information state or a terminal state. An information state may specify whether the task has started executing, progress of the task, etc. A terminal state may represent an end of the computation (e.g., success or failure).

2. Execution States

The microservice 340 may transmit multiple notifications of execution states to the orchestrator service 306. In the example illustrated in FIG. 3, the state module 309 receives the key ID 316 and a notification of the execution state 344 from the microservice 340. The state module 309 uses the key ID 316 to associate the execution state 344 with the original callout function 312. In an example, the notification provides the state module 309 with information on where to retrieve the execution state 344. In another example, the state module 309 receives the notification by receiving the execution state 344 from the microservice 340. If the microservice 340 has finished completing the task, the microservice 340 may also provide an external output 348 to the state module 309.

Based on the key ID 316, the execution state 344, and/or the external output 348 of the microservice 340, the execution module 307 may execute the callback function 314 and/or provide a set of input parameters 362 to the callback function 314. The callback function 314 receives the set of input parameters 362 and provides, based on the set of input parameters 362, a function output 318. The function output 318 and/or the external output 348 may be used as input for executing the next controller 320 in the workflow 304. The function output 318 may act as a function return value and abstracts away the fact that the controller 310 had requested a service from an external system (e.g., the microservice 340), waited for a variable timeframe for the service to return a response, and received a response from the service. The state module 309 receives the function output 318.

The execution state 344 may indicate one or more of the following examples. In an example, the execution state 344 indicates that the microservice 340 has started processing data based on the callout function 312. In another example, the execution state 344 indicates a progress of the microservice 340. For example, the progress may indicate a percentage of the task completed (e.g., 10%) and/or not yet completed (e.g., 90%) by the microservice 340. In these examples, the microservice 340 is pending. A microservice is pending if it is still processing but has not yet completed the task. It may be desirable to not proceed to the next function until the microservice 340 has completed execution of the task.

The state module 309 receives the execution state 344 indicating that the microservice 340 is pending. The state module 309 may include the execution state 344 in the set of input parameters 362. Alternatively, the state module 309 may transform the execution state 344 into an input that is understandable by the callback function 314, where the input indicates that the microservice 340 is pending. The execution module 307 executes the callback function 314 having the set of input parameters 362. The callback function 314 may return, based on the set of input parameters 362 indicating that the microservice 340 is pending, an empty value indicating not to proceed to the next function. In this example, the function output 318 may include the empty value (e.g., NULL).

In another example, the execution state 344 indicates that the microservice 340 has experienced an error in processing the task. The state module 309 receives the execution state 344 indicating the error. The state module 309 may include the execution state 344 in the set of input parameters 362. Alternatively, the state module 309 may transform the execution state 344 into an input that is understandable by the callback function 314, where the input indicates that the microservice 340 has experienced an error. The execution module 307 executes the callback function 314 having the set of input parameters 362 for exception handling. The callback function 314 receives the error indication via the set of input parameters 362 and may throw an exception. Exception handling may include performing a retry of the task (e.g., calling into the microservice again) if the number of retries for the task is below a threshold, declaring a permanent failure if the number of retries for the task is above the threshold, troubleshooting for network issues, sending an error message to an administrator, etc. In this example, the function output 318 may be based on the exception handling.

In another example, the execution state 344 indicates that the microservice 340 has successfully completed the task. The microservice may also transmit an external output 348 based on execution of the microservice 340 using the set of input parameters 342. The state module 309 receives the execution state 344 indicating the successful completion of the task and/or the external output 348 and transmits the set of input parameters 362, which indicates the successful completion of the task and/or the external output 348, to the callback function 314 for processing.

The state module 309 may include the execution state 344 and/or the external output 348 in the set of input parameters 362. Alternatively, the state module 309 may transform the execution state 344 and/or the external output 348 into an input that is understandable by the callback function 314, where the input indicates the successful execution of the microservice 340 and/or the external output 348. The execution module 307 executes the callback function 314 having the set of input parameters 362. The callback function 314 may return, based on the set of input parameters 362 indicating successful completion and/or the external output 348 of the microservice 340, a completed value indicating that the current function (e.g., controller 310) executed successfully and processing of the workflow 304 may proceed to the next function in the workflow 304 (e.g., controller 320). The function output 318 may include the completed value along with information based on the external output 348.

In keeping with the above example in which the microservice 340 is a data pulling service, the execution state 344 may indicate that the microservice 340 has successfully completed the data pulling task. Additionally, the external output 348 may return, for example, a location (e.g., filename) of where the data pulled by the microservice 340 is stored, the number of records stored at the location, the table names from which data was retrieved, and an amount of time consumed for processing the task. The external output 348 may include different and/or additional information. The execution module 307 may provide the filename to the callback function 314 via the set of input parameters 362. The callback function 314 accepts the filename and may include the filename in the function output 318, which may be provided to the next controller.

3. Execution of the Remainder of the Workflow

The callback function 314 returns the function output 318 to the orchestrator service 306. The execution module 307 receives the function output 318 and determines, based on the function output 318, whether to proceed executing the workflow 304. The execution module 307 may determine, based on the function output 318, whether to execute the callout function 322. Execution of the callout function 322 causes invocation of a call 375 to the microservice 350.

In an example, the function output 318 includes an empty value (e.g., NULL), which provides an indication to not proceed to the next function. In response to receiving the empty value in the function output 318, the execution module 307 determines to not proceed to execute the next function. In another example, the function output 318 includes a completed value, which indicates that the current function (e.g., controller 310) executed successfully and to proceed to the next function (e.g., controller 320). In response to receiving the completed value in the function output 318, the execution module 307 determines to proceed to execute the next function. In this example, the execution module 307 may proceed to execute the next controller 320. The execution module 307 may execute the controller 320 by executing the callout function 322 that causes invocation of the call 375 to the microservice 350. The microservice 350 may then proceed to process a task and provide output to the orchestrator service 306.

Actions similar to those described for execution of the controller 310 and communications between the controller 310 and the microservice 340 may be performed for execution of the controller 320 and communications between the controller 320 and the microservice 350.

For example, in keeping with the above example in which the microservice 340 pulls data and the function output 318 includes the name of the file storing the data that was pulled from the database by the microservice 340, the microservice 350 trains the data stored in the file specified in the function output 318. The microservice 350 may train machine learning models from the data that was pulled from the database by the microservice 340. The microservice 350 may receive a key ID 376 and a set of input parameters 372 including the filename via the call 375. After the microservice 350 has completed the training task, the microservice 350 may transmit a notification of an execution state based on the invocation of the call 375 to the orchestrator service 306. The state module 309 receives the notification of the execution state and transmits the execution state to the callback function 324. The callback function 324 provides, based on the execution state provided by the microservice 350, a function output 319 to the orchestrator service 306.

Additionally, in keeping with the above example in which the microservice 350 trains the dataset stored in the file pulled by the microservice 340, the microservice 360 scores the trained data. The microservice 360 may receive a key ID 386 and a set of input parameters 382 including the filename via a call 385. After the microservice 360 has scored the trained data stored in the applicable file, the microservice 360 may transmit a notification of an execution state based on the invocation of the call 385 to the orchestrator service 306. The state module 309 receives the notification of the execution state and transmits the execution state to the callback function 334. The callback function 334 provides, based on the execution state provided by the microservice 360, a function output 329 to the orchestrator service 306.

C. Track a State of the Workflow

An instruction pointer may reference code associated with execution of the callout function 312. While the instruction pointer references the code and the orchestrator service 306 is waiting for a response from a called microservice, no other instructions may be executed. As discussed, the time it takes for a microservice to complete a task may vary (e.g., a couple minutes, hours, or days). It may be desirable for the state module 309 to suspend execution of the workflow 304 and save its associated state to free resources used for executing the workflow 304 such that the resources may be used elsewhere. By doing so, the orchestrator service 306 may handle a larger number of flows efficiently and/or may direct its processing resources elsewhere.

In an example, after the callout function 312 calls into the microservice 340, the orchestrator service 306 may suspend the execution of the workflow 304 and save its state. After the state of the workflow execution is saved, the orchestrator service 306 may free resources (e.g., memory) associated with the processing of the workflow 304. For example, a thread executing on the computing system 302 may execute the callout function 312 and after the state module 309 saves the workflow state, the orchestrator service 306 may release the thread so that it can execute or process other data (e.g., another workflow). Execution of the workflow 304 may be suspended until the orchestrator service 306 receives an execution state and/or an external output from the microservice 340, where the execution state indicates that the microservice has completed its task. The orchestrator service 306 may reanimate the workflow 304 after receiving an execution state indicating that the microservice 340 has completed the task and/or the external output from the microservice. The execution module 307 may accordingly execute the callback function 314 having the set of input parameters 362 and start executing the workflow 304 again.

Figure 4:
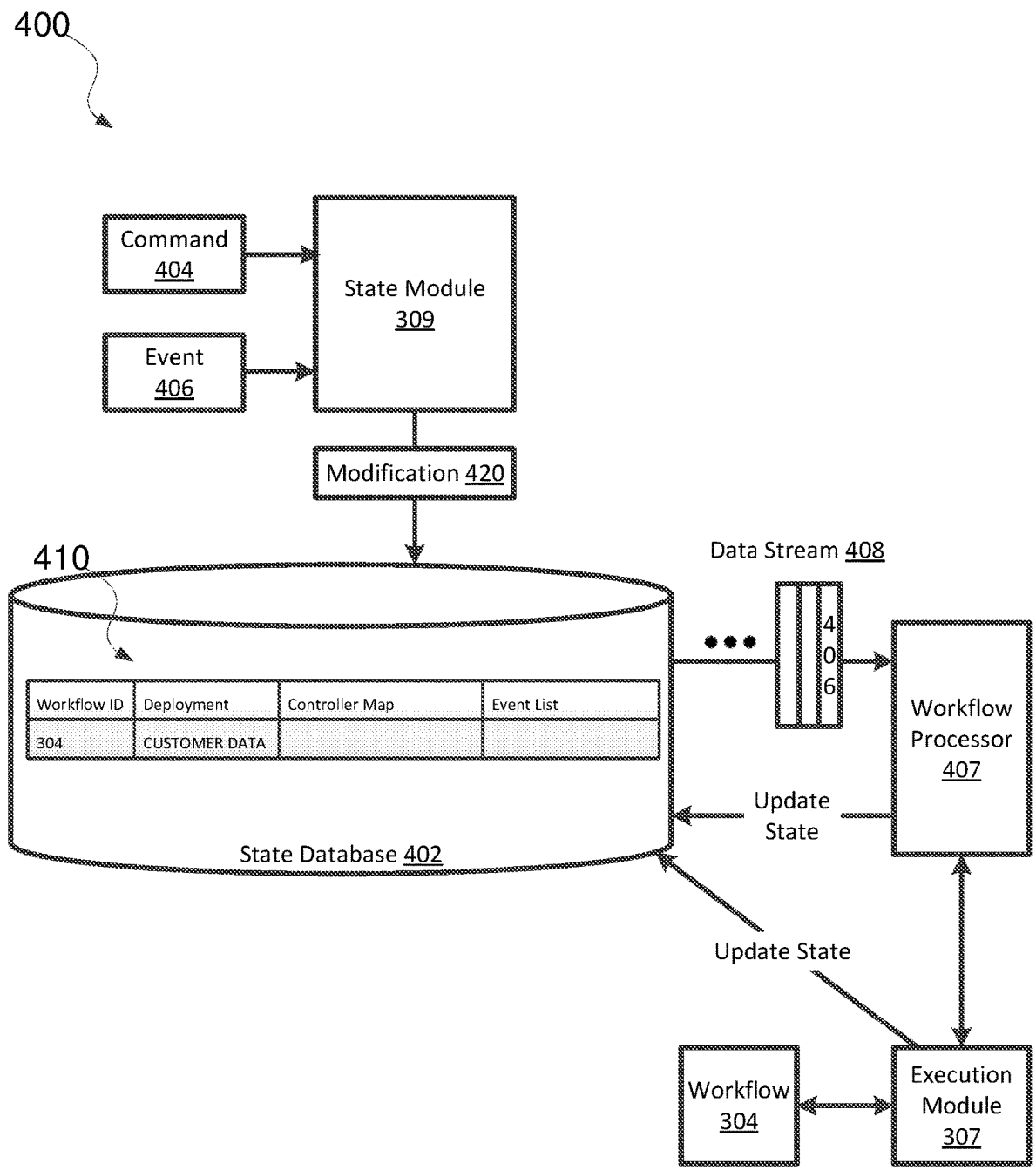
FIG. 4 illustrates a diagram for saving a state of a workflow according to some embodiments.

FIG. 4 illustrates a diagram 400 for saving a state of a workflow according to some embodiments. The state module 309 may track a state of the workflow 304 by creating or updating workflow records stored in and/or deleting workflow records from the state database 402. Each workflow record corresponds to one workflow and provides an overall state of the workflow. The state module 309 accepts one or more commands 404 and/or one or more events 406 and writes the one or more commands 404 and/or one or more events 406 to the state database 402. A command may be any input that commands the orchestrator service 306 to perform an action. In an example, the Deploy command instructs the orchestrator service 306 to deploy and start running an application. In another example, the Retrain command retrains the model for an application. In another example, the Undeploy command undeploys an application and frees the resources used by the application. Additionally, an event 406 is any input that notifies the orchestrator service 306 of a state of a computation (e.g., pull data from a database, training a dataset, etc.) or an interaction (e.g., a user approving a trained model for scoring). An event 406 may include, for example, the execution state 344 discussed in relation to FIG. 3.

When a microservice provides a notification of an event 406 to the state module 309, the state module 309 updates the appropriate workflow record by adding the event to the event list. The state module 309 may write a state of the workflow 304 to the state database 402. The state database 402 may be a NoSQL database that is a key-value store. The primary key for the workflow record may be a workflow ID that identifies a workflow. Based on receiving a command 404 or an event 406, the state module 309 may send a modification 420 to the state database 402. The modification 420 may be written to a data stream 408. The modification 420 may be, for example, an insertion of a workflow record or an update of a workflow record stored in the state database 402. In an example, the state module 309 updates the event list based on the received command or event.

A workflow processor 407 includes listeners that listen for and process change events. The workflow processor 407 listens for the modifications written to the data stream 408 and processes the events 406. The modifications 420 to the state database 402 may be transmitted to the data stream 408 as a change event. The workflow processor 407 may be incorporated into or separate from the orchestrator service 306.

Additionally, the execution module 307 may update the workflow record in the state database directly. For example, if a callout function included in a controller has successfully executed, the execution module 307 may update the workflow record to include an entry indicating that the controller is pending. In another example, if a callback function included in a controller has successfully executed, the execution module 307 may update the workflow record to include an entry indicating that the controller has successfully completed execution.

In an example, a developer writes a workflow using a standard library provided by a high-level programming language and exposes the workflow. In an example, the high-level programming language is Java 8, which provides the ability to compose and chain functions. The state module 309 may receive a Deploy command to deploy the workflow 304. Based on receiving the Deploy command, the state module 309 creates a new workflow record 410 in the state database 402. The modification to the state database 402 (creation of the new workflow record) is reflected in the data stream 408. The workflow processor 407 detects that a new workflow record has been created in the state database 402 and provides this information to the execution module 307, which instantiates execution of the workflow 304 by passing the customer specific data (specified in the deployment column) into the workflow 304.

The workflow record 410 represents the state of the workflow 304. The workflow record 410 includes a column for the workflow ID, deployment information, a controller map, and an event list. The workflow ID may be used to access the state of the workflow identified by the workflow ID. The deployment information may specify at least some of the data used for processing.

Further, the controller map may include zero or more entries, each entry including a key-value pair. One or more entries of the key-value pairs may be appended to the controller map. The key may be the controller name, and the value may be the state of the controller. In an example, a value in an entry in the controller map is "Pending," which indicates that the callout function included in the controller executed successfully and the controller is waiting for a callback. In another example, a value in an entry in the controller map is "Completed," which indicates that the controller finished executing. In this example, the value may also include the return value of the controller. The return value of the controller may correspond to the function output 318 in FIG. 3. In another example, a value in an entry in the controller map is "FailedCallout," which indicates that the callout function included in the controller failed during execution. In another example, a value in an entry in the controller map is "FailedCallback," which indicates that the callback function included in the controller failed during execution.

Furthermore, the event list stored in the workflow record 410 includes a list of unprocessed events. The state module 309 may append events 406 to the event list in the order in which they are received. As notifications of events are received, the state module 309 appends the event to the end of the event list. Multiple controllers may execute at the same time for the same workflow 304. Accordingly, different external systems may send notifications of events to the state module 309, and the state module 309 may use the event list to determine which event came first, second, etc. The workflow processor 407 detects events via the data stream 408 and updates, based on the detected event, the workflow record 410. In an example, the workflow processor 407 updates the controller map and removes processed events from the event list.

FIG. 4 will be discussed in relation to FIG. 3 and FIGS. 5A-5D to provide more details on saving a state of a workflow 304 to the state database 402. FIGS. 5A-5D show updated workflow records associated with the workflow 304 according to some embodiments. During execution of the workflow 304, if the execution module 307 encounters a controller that the execution module 307 has not yet executed, the execution module 307 executes the callout function included in the controller. In an example, the execution module 307 encounters the controller 310, which has not yet been executed. If a failure is encountered when executing the callout function 312, the execution module 307 may update the state database 402 with an indication of the callout failure. Based on the callout failure, the execution module 307 may insert an entry into the controller map including the key-value pair "Controller310->"Callout-Failed(ErrorMessage)," with the ErrorMessage parameter being the error message of the callout failure.

FIG. 5A shows an example updated workflow record if the callout function is successful according to some embodiments. If execution of the callout function 312 is successful, the execution module 307 may insert an entry including the key-value pair "Controller310->"Pending(KeyID)" into the controller map, with the KeyID parameter being the key ID generated by the key module 308 associated with the original callout function 312. The updated entry may indicate that the controller 310 is waiting for a response from the microservice 340 and is thus in a pending state. Based on the call 315, the microservice 340 may provide a notification of a "DataPullStartedEvent" event to the state module 309, the event indicating that the microservice 340 has started pulling data. In response to receiving the notification of the "DataPullStartedEvent" event, the state module 309 updates the workflow record by writing the event associated with the controller 310 to the event list. The DataPullStartedEvent" event is an informational event. Based on detecting the "DataPullStartedEvent" event, the workflow processor 407 knows that the microservice 340 has started performing its task.

The workflow processor 407 may suspend any further processing of the workflow 304 and free the applicable resources associated with execution of the workflow 304. For example, the workflow processor 407 may send a special exception that suspends the execution of the workflow 304 and frees applicable resources. The workflow 304 may be reanimated (or unsuspended) when the state module 309 receives another event for the workflow 304. As discussed, the workflow processor 407 captures the change event in the data stream 408. In response to detecting the change event or the modified workflow record, the workflow processor 407 reanimates the workflow 304 that was suspended earlier. To reanimate the workflow 304, the workflow processor 407 may start executing the workflow 304 as usual, but when the workflow processor 407 encounters a controller that has a value "Completed(ReturnValue)" in the controller map, the workflow processor 407 determines that the callout and the callback functions should not be executed. Accordingly, these functions are not executed again. The ReturnValue parameter may be any value. Additionally, the workflow processor 407 may inform the execution module 307 that the controller has returned "ReturnValue" directly. In other words, if the execution module 307 encounters a controller that has executed successfully earlier, the execution module 307 may retrieve the result of the execution from the state database 402 and return it as if the function just executed, without actually executing its contents.

If the execution module 307 encounters a controller including a callout function that has been executed by the execution module 307, but the controller has not completed its execution, the state module 309 records the name of the controller and the associated key ID. The state module 309 may retrieve the key ID from the event 406 and delegate it to the controller that is waiting for an event with the matching key ID. In an example, the controller may return an empty value, which will send a special exception and suspend the execution of the workflow 304 waiting for the next event. Thereafter, the execution module 307 may free the applicable resources. In another example, the controller may return a completed value. In response to the completed value, the execution module 307 may update the state of the controller in the state database 402. In this example, the execution module 307 may continue executing the rest of the functions in the sequence.

For example, when the workflow processor 407 encounters a controller that has a value "Pending(KeyID)" in the controller map and has the same key ID as an event, the workflow processor 407 passes the event into the callback function included in the controller. Accordingly, the execution module 307 executes the callback function 314 included in the controller 310. The KeyID parameter may be the key ID that is generated by the key module 308. If a failure is encountered when executing the callback function 314, the execution module 307 may insert an entry including the key-value pair "Controller310->"CallbackFailed(ErrorMessage)" into the controller map, with the ErrorMessage parameter being the error message of the callback failure. If the callback function has failed, the execution module 307 may free the applicable resources associated with executing the workflow 304 and suspend the execution of the workflow 304.

FIG. 5B shows an updated workflow record after execution of the controller 310 has successfully completed according to some embodiments. As shown in FIG. 5B, if execution of the callback function 314 is successful, the execution module 307 may insert an entry including the key-value pair "Controller310->Completed(Value)" into the controller map. The Value parameter may be any value. For example, in FIG. 5C, a DatasetID may be passed as the Value parameter. The first entry in the controller map indicates that the callback function 314 has completed execution and returned a data set identified by DatasetID. The execution module 307 may continue executing the next function, which may be the controller 320 corresponding to the microservice 350.

Additionally, the execution module 307 may insert an entry including the key-value pair "Controller320->Pending (KeyID)" into the controller map in FIG. 5B, after the callout function 322 included in the controller 320 has successfully executed. Accordingly, the controller 320 is waiting for a response and is in a pending state. As shown, the microservice 350 sent a "ModelingStartedEvent" event to the state module 309, which inserted the event into the event list. The ModelingStartedEvent" event is an informational event. Based on detecting the "ModelingStartedEvent" event, the workflow processor 407 knows that the microservice 350 has started performing its task and may suspend the workflow 304 until another event arrives in the event list.

FIG. 5C shows an updated workflow record after the microservice 350 sends an event indicating that the microservice has finished its task according to some embodiments. Additionally, the microservice 350 sent a "ModelingFinishedEvent" event to the state module 309, which inserted the event into the event list. The workflow record captured in FIG. 5C shows a snapshot of the workflow record at a point in time after the callout function 322 successfully executed, but before the workflow processor 407 finished processing the "ModelingFinishedEvent" event.

FIG. 5D shows an updated workflow record after the workflow processor 407 has finished processing the "ModelingFinishedEvent" event. In an example, the callback function 324 successfully executed and the execution module 307 updates the entry corresponding to the controller 320 in the control map to the key-value pair "Controller320->Completed(Value)," where the Value parameter is the ModelID. Additionally, the workflow processor 407 processes the "ModelingFinishedEvent" event and removes this event from the event list.

Although the workflow processor 407 is described as detecting events via the data stream 408, this is not intended to be limiting and the workflow processor 407 may detect events using other techniques that are within the scope of the present disclosure. For example, the workflow processor 407 may check the event list periodically to detect events rather than listening to the data stream 408. In another example, the workflow processor 407 detects events by subscribing to event notifications received by the state module 309. Additionally, although the workflow processor 407 is illustrated as being separate from the execution module 307, it should be understood that the workflow processor 407 may be incorporated in the execution module 307.

Although the orchestrator service 306 is shown as orchestrating one workflow 304, it should be understood that the orchestrator service 306 may execute more than one workflow. In an example, the orchestrator service 306 may orchestrate hundreds, thousands, or millions of workflows.

III. Operational Flow

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Figure 6:
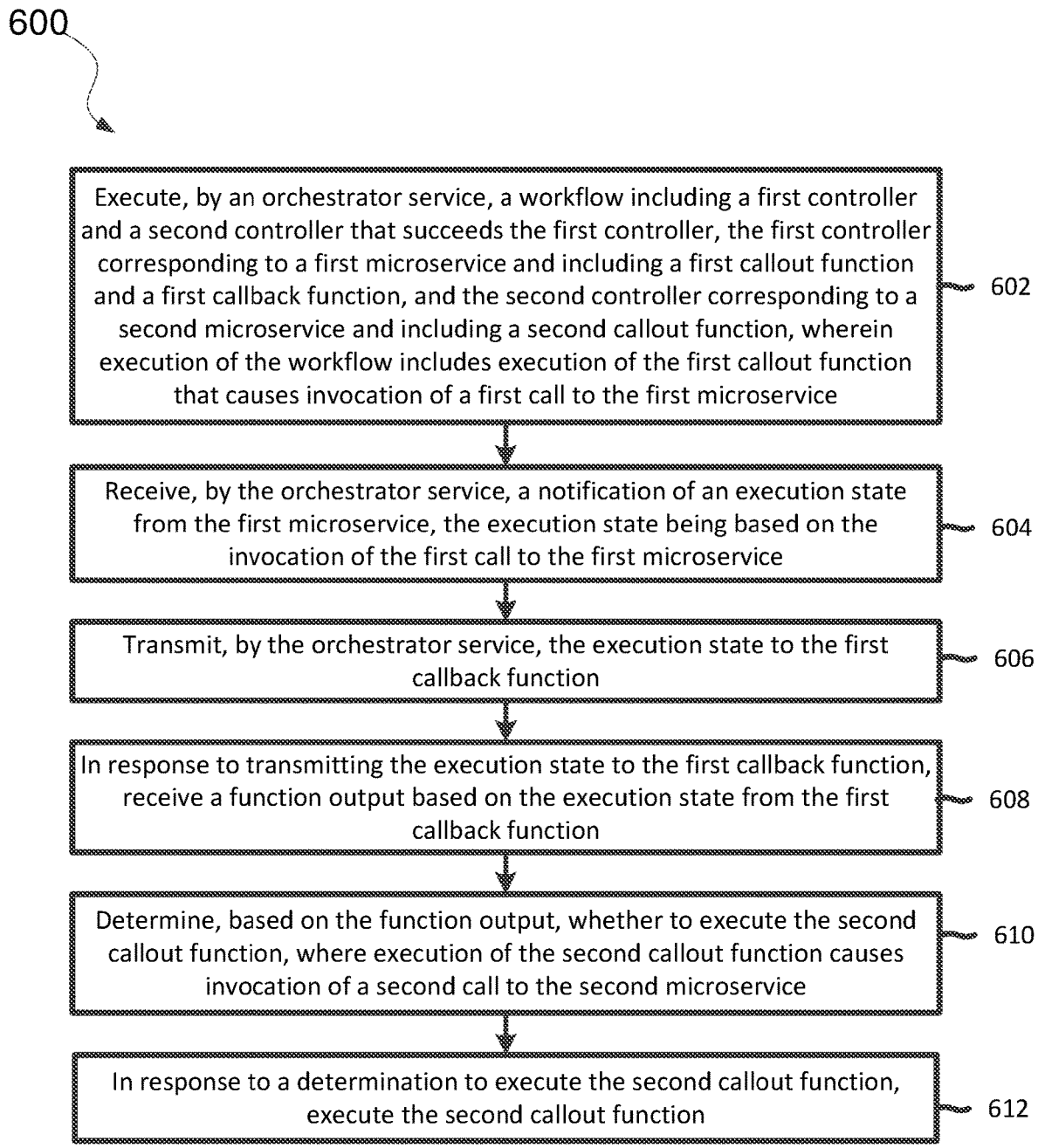
FIG. 6 is a flowchart of a method for orchestrating a workflow according to some embodiments.

FIG. 6 is a flowchart of a method 600 for orchestrating a workflow according to some embodiments. One or more of the processes 602-612 of the method 600 may be implemented, at least in part, in the form of executable code stored on non-transitory, tangible, machine-readable media that when run by one or more processors may cause the one or more processors to perform one or more of the processes 602-612. In some embodiments, method 600 can be performed by one or more computing devices in systems or diagrams 100, 200, 300, and 400 of FIGS. 1, 2, 3, and 4, respectively, including the execution module 307, state module 309, key module 308, and/or workflow processor 407. Aspects of the processes 602-612 of method 600 have been covered in the description for FIGS. 1, 2, 3, 4, and 5; and additional aspects are provided below.

At a process 602, a computing device (e.g., via execution module 307) executes, by an orchestrator service, a workflow including a first controller and a second controller that succeeds the first controller, the first controller corresponding to a first microservice and including a first callout function and a first callback function, and the second controller corresponding to a second microservice and including a second callout function, wherein execution of the workflow includes execution of the first callout function that causes invocation of a first call to the first microservice. The first and second microservices may be asynchronous microservices. In an example, the orchestrator service may generate a first key ID associated with the first callout function, receive an event associated with a second key ID, and associate the event with the first callout function if the first key ID and the second key ID match.

At a process 604, a computing device (e.g., via state module 309) receives, by the orchestrator service, a notification of an execution state from the first micro service, the execution state being based on the invocation of the first call to the first microservice. In an example, the execution state indicates that the first microservice is pending. In this example, the function output may return a first value indicating to not proceed to the second controller if the execution state indicates that the first microservice is pending. In another example, the execution state indicates that the first microservice has experienced an error. In this example, the first callback function may include exception handling for the error. In another example, the execution state may indicate that the first microservice has successfully completed. In this example, the function output may return a second value indicating to proceed to the second controller if the execution state indicates that the first microservice has successfully completed.

At a process 606, a computing device (e.g., via state module 309) transmits, by the orchestrator service, the execution state to the first callback function. At a process 608, in response to transmitting the execution state to the first callback function, a computing device (e.g., via state module 309) receives a function output based on the execution state from the first callback function. In an example, the function output may include a location at which an output of the first microservice is stored. Additionally, the orchestrator service may receive an external output of the first microservice, where the external output is based on the first call to the first microservice.

At a process 610, a computing device (e.g., via execution module 307) determines, based on the function output, whether to execute the second callout function, where execution of the second callout function causes invocation of a second call to the second microservice. At a process 612, in response to a determination to execute the second callout function, a computing device (e.g., via execution module 307) executes the second callout function.

In some embodiments, one or more actions illustrated in processes 602-612 may be performed for any number of objects per-tenant. It is also understood that additional processes may be performed before, during, or after processes 602-612 discussed above. It is also understood that one or more of the processes of method 600 described herein may be omitted, combined, or performed in a different sequence as desired.

For example, the orchestrator service 306 may suspend the execution of the workflow and save a state of the workflow. In an example, the orchestrator service 306 may receive one or more events from the first controller and update the state of the workflow in accordance with the one or more events. The orchestrator service 306 may receive an event indicating execution of the first callback function and may reanimate the workflow in response to receiving the event indicating execution of the first callback function. In some examples, an update to the state of the workflow may include updating a controller map including an entry having a key-value pair, wherein a key in the key-value pair is a name of the first controller, and a value in the key-value pair is a state of the first controller.

Unless specifically stated otherwise as apparent from the following discussion, it is appreciated that throughout the description, discussions utilizing terms such as "determining," "creating," "inserting," "executing," "receiving," "transmitting," "identifying," "generating," "associating," "suspending," "saving," "updating," "reanimating," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modifications, changes and substitutions is contemplated in the foregoing disclosure and in some instances, some features of the embodiments may be employed without a corresponding use of other features. One of ordinary skill in the art would recognize many variations, alternatives, and modifications. Thus, the scope of the disclosure should be limited only by the following claims, and it is appropriate that the claims be construed broadly and in a manner consistent with the scope of the embodiments disclosed herein.

What is claimed is:

1. A computing device comprising:
    a memory containing machine readable medium storing machine executable code; and
    one or more processors coupled to the memory and configurable to execute the machine executable code to cause the one or more processors to:
        execute, by an orchestrator service, a workflow including a first controller and a second controller that succeeds the first controller, the first controller corresponding to a first microservice and including a first callout function and a first callback function, and the second controller corresponding to a second microservice and including a second callout function, wherein execution of the workflow includes execution of the first callout function that causes invocation of a first call to the first microservice;
        generate, by the orchestrator service, a first key identifier (ID) associated with the first callout function;
        receive an event associated with a second key ID;

associate the event with the first callout function if the first key ID matches the second key ID;

receive, by the orchestrator service, a notification of an execution state from the first microservice, the execution state being based on the invocation of the first call to the first microservice;

transmit, by the orchestrator service, the execution state to the first callback function;

in response to transmitting the execution state to the first callback function, receive a function output based on the execution state from the first callback function;

determine, based on the function output, whether to execute the second callout function, wherein execution of the second callout function causes invocation of a second call to the second microservice; and in response to a determination to execute the second callout function, execute the second callout function.

2. The computing device of claim 1, wherein the first and second microservices are asynchronous microservices.

3. The computing device of claim 1, wherein the execution state indicates that the first microservice is pending, and wherein the function output returns a first value indicating to not proceed to the second controller if the execution state indicates that the first microservice is pending.

4. The computing device of claim 1, wherein the execution state indicates that the first microservice has experienced an error, and wherein the first callback function includes exception handling for the error.

5. The computing device of claim 1, wherein the execution state indicates that the first microservice has successfully completed, and wherein the function output returns a second value indicating to proceed to the second controller if the execution state indicates that the first microservice has successfully completed.

6. The computing device of claim 1, wherein the function output includes a location at which an output of the first microservice is stored.

7. The computing device of claim 1, wherein the machine executable code further causes the one or more processors to:

receive, by the orchestrator service, an external output of the first microservice, the external output being based on the first call to the first microservice.

8. The computing device of claim 1, wherein the machine executable code further causes the one or more processors to:

suspend, by the orchestrator service, the execution of the workflow; and save, by the orchestrator service, a state of the workflow.

9. The computing device of claim 8, wherein the machine executable code further causes the one or more processors to:

receive, by the orchestrator service, one or more events from the first controller; and update, by the orchestrator service, the state of the workflow in accordance with the one or more events.

10. The computing device of claim 8, wherein the machine executable code further causes the one or more processors to:

receive, by the orchestrator service, the event indicating execution of the first callback function; and reanimate, by the orchestrator service, the workflow in response to receiving the event indicating execution of the first callback function.

11. The computing device of claim 8, wherein an update to the state of the workflow includes updating a controller map including an entry having a key-value pair, wherein a key in the key-value pair is a name of the first controller, and a value in the key-value pair is a state of the first controller.

12. A method performed by one or more processors executing machine executable code, the method comprising:

executing, by an orchestrator service, a workflow including a first controller and a second controller that succeeds the first controller, the first controller corresponding to a first microservice and including a first callout function and a first callback function, and the second controller corresponding to a second microservice and including a second callout function, wherein execution of the workflow includes execution of the first callout function that causes invocation of a first call to the first microservice;

generating, by the orchestrator service, a first key identifier (ID) associated with the first callout function;

receiving an event associated with a second key ID;

associating the event with the first callout function if the first key ID matches the second key ID;

receiving, by the orchestrator service, a notification of an execution state from the first microservice, the execution state being based on the invocation of the first call to the first microservice;

transmitting, by the orchestrator service, the execution state to the first callback function;

in response to transmitting the execution state to the first callback function, receiving a function output based on the execution state from the first callback function;

determining, based on the function output, whether to execute the second callout function, wherein execution of the second callout function causes invocation of a second call to the second microservice; and in response to a determination to execute the second callout function, executing the second callout function.

13. The method of claim 12, further comprising:

suspending, by the orchestrator service, the execution of the workflow; and saving, by the orchestrator service, a state of the workflow.

14. The method of claim 13, further comprising:

receiving, by the orchestrator service, one or more events from the first controller; and updating, by the orchestrator service, the state of the workflow in accordance with the one or more events.

15. The method of claim 13, further comprising:

receiving, by the orchestrator service, the event indicating execution of the first callback function; and reanimating, by the orchestrator service, the workflow in response to receiving the event indicating execution of the first callback function.

16. The method of claim 13, wherein an update to the state of the workflow includes updating a controller map including an entry having a key-value pair, a key in the key-value pair being a name of the first controller, and a value in the key-value pair being a state of the first controller.

17. The method of claim 12, wherein the first and second microservices are asynchronous microservices.

18. A non-transitory machine-readable medium comprising executable code which when executed by one or more processors associated with a computing device are adapted to cause the one or more processors to perform a method comprising:

executing a workflow including a first controller and a second controller that succeeds the first controller, the first controller corresponding to a first microservice and including a first callout function and a first callback function, and the second controller corresponding to a second microservice and including a second callout function, wherein execution of the workflow includes execution of the first callout function that causes invocation of a first call to the first microservice;

generating, by the orchestrator service, a first key identifier (ID) associated with the first callout function;

receiving an event associated with a second key ID;

associating the event with the first callout function if the first key ID matches the second key ID;

receiving a notification of an execution state from the first microservice, the execution state being based on the invocation of the first call to the first microservice;

transmitting the execution state to the first callback function;

in response to transmitting the execution state to the first callback function, receiving a function output based on the execution state from the first callback function;

determining, based on the function output, whether to execute the second callout function, wherein execution of the second callout function causes invocation of a second call to the second microservice; and in response to a determination to execute the second callout function, executing the second callout function.

19. The non-transitory machine-readable medium of claim 18, wherein the first and second microservices are asynchronous microservices.

20. The non-transitory machine-readable medium of claim 18, wherein the first microservice indicates a state of the workflow using the event.

* * * * *